(12) United States Patent
Schad

(10) Patent No.: US 6,478,572 B1
(45) Date of Patent: Nov. 12, 2002

(54) ENERGY EFFICIENT EXTRUDER DRIVE

(75) Inventor: Robert D. Schad, Toronto (CA)

(73) Assignee: Husky Injection Molding Systems, Ltd. (CA)

( * ) Notice: Subject to any disclaimer, the term of this patent is extended or adjusted under 35 U.S.C. 154(b) by 169 days.

(21) Appl. No.: 09/610,814

(22) Filed: Jul. 6, 2000

(51) Int. Cl.⁷ .............................................. B29C 45/50
(52) U.S. Cl. ........................ 425/574; 425/145; 425/150
(58) Field of Search ................................ 425/145, 150, 425/574

(56) References Cited

U.S. PATENT DOCUMENTS

| | | | |
|---|---|---|---|
| 3,734,667 A | 5/1973 | Dray | 425/190 |
| 3,857,658 A * | 12/1974 | Muzsnay | 425/145 |
| 4,290,701 A | 9/1981 | Schad | 366/77 |
| 4,557,683 A | 12/1985 | Meeker et al. | 425/147 |
| 4,712,991 A | 12/1987 | Hehl | 425/145 |
| 4,758,391 A | 7/1988 | Shimizu et al. | 264/40.5 |
| 4,809,586 A * | 3/1989 | Gage et al. | 91/6 |
| 4,878,519 A * | 11/1989 | Berding et al. | 138/31 |
| 4,907,621 A * | 3/1990 | Sugimura et al. | 138/30 |
| 4,943,756 A * | 7/1990 | Conlety, III et al. | 318/671 |
| 4,984,980 A | 1/1991 | Ueno | 425/595 |
| 5,251,660 A * | 10/1993 | Hori et al. | 137/636.1 |
| 5,338,174 A | 8/1994 | Miese et al. | 425/150 |
| 5,513,971 A | 5/1996 | Nakamura et al. | 425/145 |
| 5,645,868 A | 7/1997 | Reinhart | 425/145 |
| 5,688,535 A | 11/1997 | Koda et al. | 425/145 |
| 5,714,176 A * | 2/1998 | Wurl et al. | 425/145 |
| 5,863,567 A | 1/1999 | Klaus | 425/145 |
| 5,916,602 A | 6/1999 | Klaus | 425/145 |
| 5,922,371 A | 7/1999 | Urbanek | 425/590 |
| 6,059,556 A | 5/2000 | Koike et al. | 425/145 |
| 6,120,277 A * | 9/2000 | Klaus | 425/145 |
| 6,257,859 B1 * | 7/2001 | Koda et al. | 425/145 |

FOREIGN PATENT DOCUMENTS

| | | | |
|---|---|---|---|
| GB | 1299781 | 4/1971 | B29C/1/16 |
| GB | 2 089 597 A | 12/1980 | H02P/7/70 |
| JP | 2-252518 | 10/1990 | |

* cited by examiner

Primary Examiner—Jan H. Silbaugh
Assistant Examiner—Emmanuel Luk
(74) Attorney, Agent, or Firm—Katten Muchin Zavis Rosenman

(57) ABSTRACT

An energy efficient drive system is provided for use on typical injection molding machines whereby a single electric motor drives both the extruder screw and a hydraulic motor that continuously charges a hydraulic accumulator during the extrusion process. During the injection cycle, the charge in the accumulator is directed to stroke the extruder screw and inject melt into the mold cavities. Another embodiment utilizes a similar arrangement on the clamp mechanism of the injection molding machine whereby the charge in the accumulator is directed to hold the mold closed during the injection cycle.

11 Claims, 4 Drawing Sheets

ENERGY EFFICIENT EXTRUDER DRIVE

BACKGROUND OF THE INVENTION

1. Field of the Invention

The present invention relates generally to molding machines and, more particularly, to an injection molding machine that uses a single electric motor to drive both a hydraulic motor for the charging of an accumulator, and a drive means, for example a feed screw and/or a mold closing means.

2. Description of the Related Art

The injection unit of an injection molding machine provides essentially two functions during the course of a normal-cycle of operation; namely, injection and extruder. In a standard reciprocating screw injection molding machine, the extruder function is accomplished when the screw is rotated, gradually moving plastic melt toward the forward end of the screw, thereby creating a pressure or force to move the screw rearward to its pre-injection position as the melt accumulates. When a sufficient amount of material is accumulated ("a shot"), the screw is moved rapidly forward (without rotation) to inject the melt straight into the mold, thus performing the injection function. The processing requirements for injection molding commercially significant plastics materials involve injection pressures of at least 15,000 psi, and frequently up to 30,000 psi.

The injection unit of a molding machine can also be designed as a "two-stage" system where the extruder and injection functions are performed by separate machine elements. In a two-stage injection system, the extruder or plasticizing function is still performed by a feed screw in a heated barrel, but all or part of the plastic melt is diverted into a "melt-accumulator" rather than being conveyed directly to the mold. The melt-accumulator is subsequently operated to perform or, at least, assist in performing the injection function. The advantages of a two-stage injection unit include more uniform plastication of material, reduced wear on the screw and barrel, and the potential for higher injection pressures. The primary disadvantage is higher cost.

Both the injection and extruder functions require an associated drive apparatus in the injection unit. In prior art hydraulic machines, the movement for the injection function is typically performed by a hydraulic cylinder, while the rotation of the feed screw for extruder run is normally accomplished by a hydraulic motor. More recently, electric motors combined with mechanical systems have been used as the direct power source in the injection unit. Some of the prior art electric systems have used separate motors for each function; i.e., one motor for rotating the feed screw and a second motor in combination with a mechanism, such as a ball screw, to convert rotary motion into the linear movement required for injection. Other prior art "hybrid" machines have used an electric motor to rotate the feed screw with the remaining functions of the machine being hydraulically driven, with power provided by an electric motor driving one or more hydraulic motors.

While the "hybrid" machine incorporates some of the advantages of both electric (better control of screw rotation) and hydraulic (lower overall cost) machines, there remains room for improvement. In particular, there is potential for a more economical system since there is excess capacity in the electric motor that rotates the screw. This motor is only used during the portion of the cycle were the thermoplastic material is extruded (plasticated) to build the shot. Since the motor and the associated variable speed drive have a relatively high cost, it is desirable to maximize the utilization of this motor. Furthermore, for the injection molding machines with variable speed motors currently available, the motors are either dedicated to specific axes (as with electromechanical systems), or are applied to standard hydraulic circuits redundantly so that no economy of control is gained by the variable speed motor and drive.

Accordingly, as is typical when new technology is applied to existing products, the effort has been to maximize the execution of the previous injection system technology so as to limit risk and retain product identity. This is especially true in all-electric injection molding machine design where hydraulic motion control has been replaced with electromechanical motion control. As a result of this limited design approach, many important advantages of electric variable speed motor drives have not been realized in their application to injection molding.

It is well established that simply replacing hydraulic drive trains with electromechanical drive trains provides significant, measurable improvement in repeatability, stability, and accuracy of the driven device. This is a result of reducing the number of components in the drive train, elimination of inherent variations in the hydraulic fluid as a function of temperature, viscosity changes due to ultimate chemical breakdown of the oil itself, eventual increasing concentration of contaminants, and so forth. However, while simply replacing the hydraulic drive train components with servo-electrical/mechanical components provides desirable performance improvement, the full potential improvement has yet to be realized.

Another consideration is that the floor space occupied by an injection molding machine has become an increasingly important criteria. As the resources once available for facilities are diverted to other assets to increase productivity, the length, width and height of a machine has become increasingly important consideration among competing machine designs.

Besides the need for increased capacity in electric injection units, there is potential for improvement in durability, repeatability, stability, and accuracy of the driven device, as well as a reduction in overall length of the machine, if a way can be found to overcome the obstacles presented by limiting application of electromechanical technology to reciprocating screw injection units.

Similarly, there is a need for an improved energy efficient system when operating a closing or clamp unit of an injection molding machine where the two halves are movable towards or away from each other for opening and closing the injection mold. In this arrangement the injection mold must be subjected to a relatively large closing force during the injection cycle. The prior art centers around apparatus that utilizes all hydraulic actuation for both the long stroke portion of opening and closing the mold as well as for applying the clamping force. More recently, electric motors have been used for the long opening and closing stroke and hydraulic pressure is utilized to apply the large clamping force during the injection cycle. The prior art however has yet to provide a compact, energy efficient drive system utilizing both electric motors and hydraulic motors.

SUMMARY OF THE INVENTION

Accordingly, it is an object of the present invention to provide an improved drive apparatus that enables the use of a single optimized electric motor to provide power for the various machine elements of an injection molding machine.

Another object of the current invention is to provide a simplified apparatus that drives both an extruder screw and a hydraulic motor simultaneously.

Still another object of the current invention is to provide an injection unit for a molding machine that contains fewer components which is more reliable and easier to maintain.

Yet another object of the present invention is to provide an efficient drive system for an injection molding machine that uses an electric motor to drive the extruder screw and a hydraulic motor which charges a hydraulic accumulator simultaneously, whereby the charge in the accumulator is used to stroke the screw during the injection cycle.

Still yet another object of the present invention is to provide an efficient drive system for an injection molding machine that uses an electric motor to drive the extruder screw and a hydraulic motor to charge an accumulator. A clutch is provided between the electric motor and the screw which allows the electric motor to continuously drive the hydraulic motor even during the injection cycle.

Yet another object of the present invention is to provide an efficient drive system for an injection molding machine that uses an electric motor to close the mold halves while simultaneously charging an accumulator and uses the charge in the accumulator to apply the clamping force during the injection/molding cycle.

In accordance with these objectives, one embodiment of the present invention is directed towards a hybrid-type injection machine where the extruder screw and a hydraulic motor are driven by an optimized variable speed electric motor simultaneously during the plasticizing process. During the plasticizing process the hydraulic motor charges a hydraulic accumulator. When enough plastic has been extruded and the required "shot" size is produced, the charge in the accumulator is used to stroke either the screw or a separate piston for injection of the melt into the mold cavities.

"Optionally, a clutch is provided between the electric motor and the extruder screw whereby the electric motor is allowed to continuously charge the accumulator by driving the hydraulic motor. The clutch is actuated to disengage the extruder screw once the required shot size is produced thereby stopping rotation of the extruder screw and allowing the screw to be stroked by a piston which is driven by the charge in the accumulator, all the while the electric motor is continuously charging the accumulator."

In another embodiment of the present invention, a separate electric motor is provided on the clamp side of the injection molding machine. The electric motor is attached to a mechanical drive means for open and closing of the mold. Also attached to the electric motor is a hydraulic motor which charges a separate accumulator. As the electric motor closes the mold, it also drives the hydraulic motor which charges the accumulator. Once the mold is completely closed, the charge in the accumulator is used to apply the large clamping force to the mold that is required during the injection/molding cycle.

In this embodiment, an optional clutch mechanism is provided between the electric motor and the mechanical drive means whereby the electric motor is continuously driving the hydraulic motor and charging the accumulator even though the mold has been completely closed. The clutch is actuated once the mold is completely closed such that the drive means is disconnected from the electric motor, thereby allowing the electric motor to continue to drive the hydraulic motor and charge the accumulator.

Providing a single electric motor which is optimized for the given loads results in a simpler and less expensive drive system. Similarly, the separate hydraulic motor can be optimized for charging the accumulator as may be required for different size injection machines. In addition, overall machine efficiency is increased by using the electric motor to perform two simultaneous functions. The addition of the clutch allows the electric motor to continuously charge the accumulator which will result in shorter cycle times as well as increase overall machine efficiency.

Overall, the present invention provides a unique hybrid drive system for an injection machine that allows for the optimization of the various drive components and provides a more efficient drive system for both the extruder screw and the clamp mechanism.

BRIEF DESCRIPTION OF THE FIGURES

The invention will be better understood in view of the detailed description of the preferred embodiments, in connection with the drawings of which.

Figure 1:
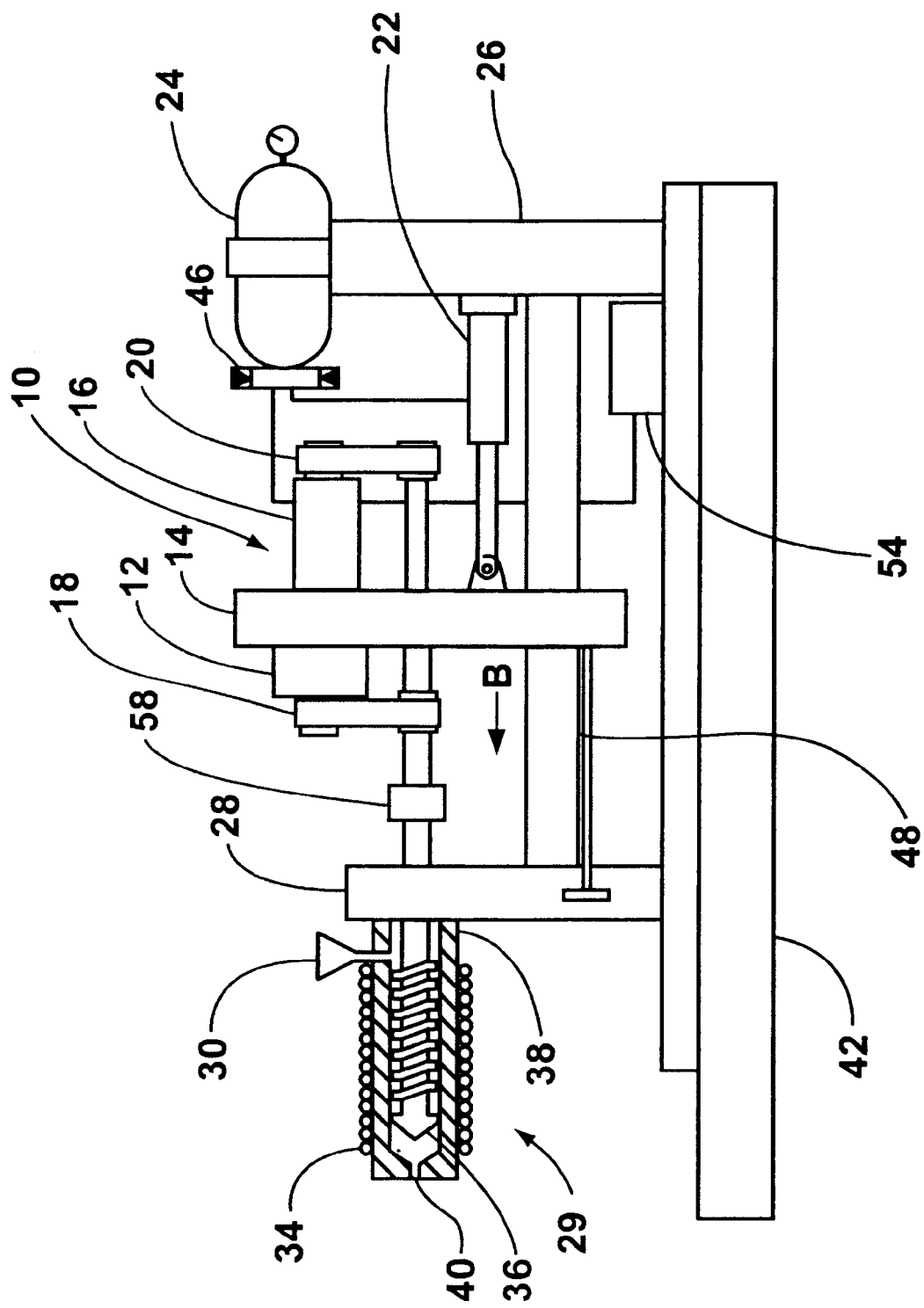
FIG. 1 is a simplified view of a push-type screw unit of an injection system of a injection molding machine with its associated displacement and/or actuating force driving apparatus.

REFERENCE NUMERALS USED IN THE FIGURES.

10—single-stage push-type screw unit
12—electric motor
14—movable plate
16—hydraulic motor
18—first drive belt
20—second drive belt
22—piston assembly
24—hydraulic accumulator
26—first fixed plate
28—second fixed plate
29—extruder assembly
30—hopper
34—heater
36—feed screw
38—extruder housing
40—outlet
42—base
46—hydraulic valve
48—guide beams
50—conduit
52—melt accumulator
54—reservoir
56—check valve
58—clutch mechanism
59—barrel
60—first stationary platen
62—second stationary platen
64—transmission means
66—movable mold half
68—tie bars
70—stationary mold half
72—movable platen
74—drive means
100—injection molding maching
200—injection molding clamp system

DESCRIPTION OF THE PREFERRED EMBODIMENT

The present invention relates to an injection unit for an injection molding machine; as such, it will be described in the context of a "typical" machine. Since the general structure and operation of injection molding machines are well known, those aspects of the apparatus which are different or take on a new use with respect to injection machines will receive primary emphasis.

FIG. 1 depicts the basic structure of an injection unit of an injection molding machine with a single-stage push-type screw unit 10 which is mounted on base 42. The extruder assembly 29 comprises an extruder housing 38, a hopper 30 for supplying solid plastic, and a rotatable and displaceable push-type feed screw 36. In thermal communication with the housing 38 is a heater 34 which maintains the melt in a molten state for injection through an outlet 40.

The device of FIG. 1 has several parallel guide beams 48, two fixed plates 26, 28 and a movable plate 14. The plate 14 is movable along the guide beams 48 by a piston assembly 22. Mounted on the plate 14 is an electric motor 12 which is connected by a first drive belt or other transmission means 18 to the feed screw 36. Also mounted on the plate 14 is a hydraulic motor 16 which is driven by the feed screw 36 through a second drive belt or other transmission means 20. In this arrangement, the reader can easily see that the electric motor 12 provides power to both the feed screw 36 and the hydraulic motor 16 simultaneously. It should be noted, the placement of the hydraulic motor 16 could easily be altered so that it could be direct driven by the electric motor 12.

In communication with the hydraulic motor 16 is a reservoir 54 for supplying hydraulic fluid and a hydraulic accumulator 24 through a hydraulic valve 46, wherein the electric motor 12 drives the hydraulic motor 16 which inturn charges the hydraulic accumulator 24 and results in the storage of energy within the accumulator 24.

Operatively mounted between the fixed plate 26 and the movable plate 14 is the piston assembly 22. The piston assembly 22 is extended during the injection process in direction "B" by the stored energy in accumulator 24. The piston assembly 22 is retracted by the force of the melt as it accumulates in front of the feed screw 36.

For charging or filling the injection mold (not shown) with plastic melt, the electric motor 12 is stopped and the piston assembly 22 is selectably actuated by the hydraulic valve 46 which directs the stored hydraulic energy in the accumulator 24 to extend the piston assembly 22 in direction "B". The push-type feed screw 36 is then pushed forwarded in the housing 38 by plate 14 which injects the molten material through outlet 40.

Alternatively, an optional clutch mechanism 58 is provided such that the electric motor 12 may be disengaged from the feed screw 36 during the injection cycle. This arrangement allows the electric motor 12 to continuously drive the hydraulic motor 16 and charge the hydraulic accumulator 24.

Figure 2:
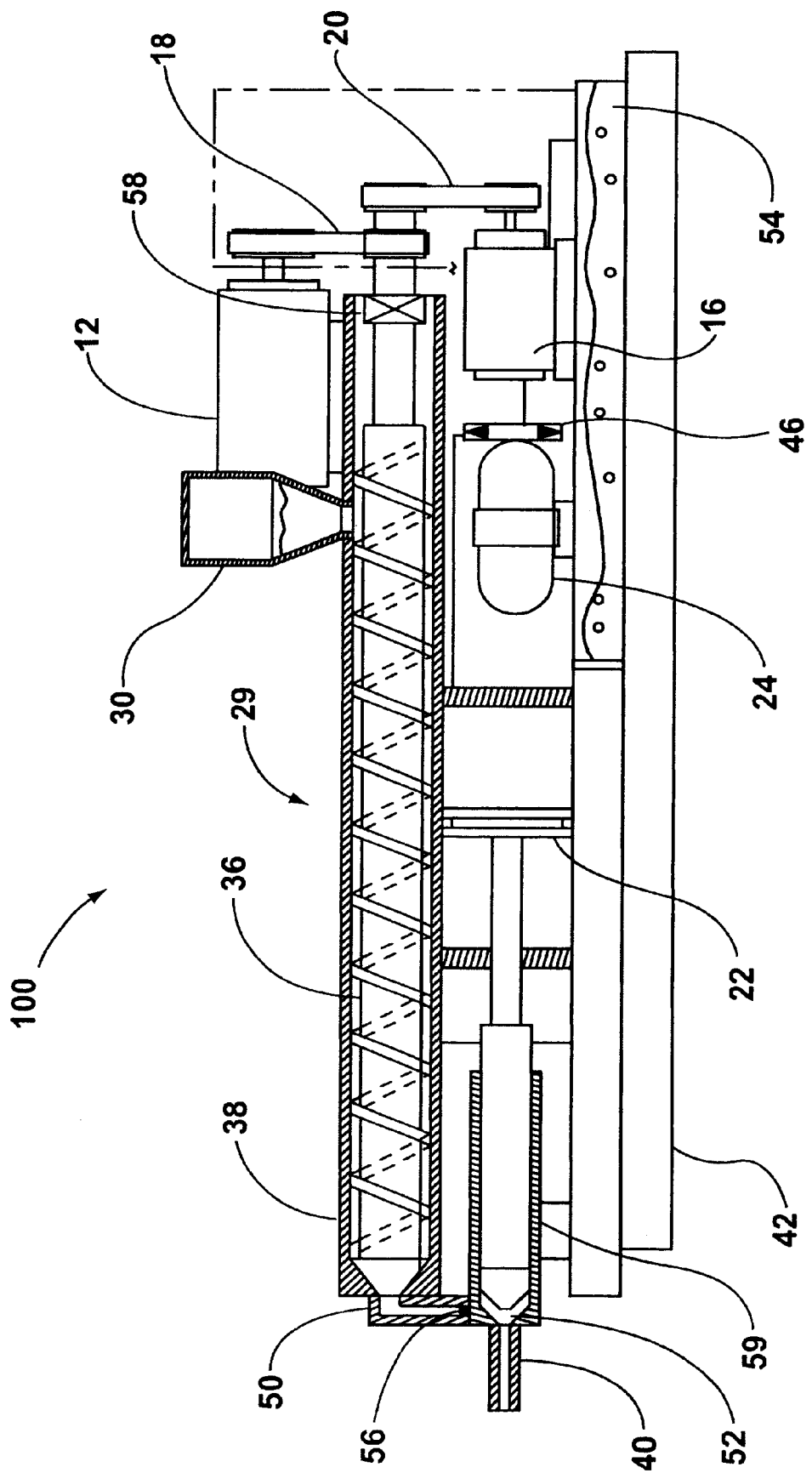
FIG. 2 is a simplified enlarged view, partially in section, of the improved two-stage injection apparatus of an injection molding machine.

Referring to FIG. 2, the apparatus of the present invention is used in conjunction with an injection molding machine 100. The general configuration of the molding machine 100 includes a two-stage electric/hydraulic injection unit which is mounted on an elongated support or base 42. The components of the injection unit 100 are specifically designed to implement electric motor drive technology in a two-stage injection unit. Preferably, the primary elements are an electrically driven extruder assembly 29 and a melt accumulator 52. The extruder assembly 29 is intended for continuous plasticizing and, therefore, has a non-reciprocating feed screw 36. If desired, however, the concepts of the present invention can also be applied to a two-stage injection system with a reciprocating feed screw like that already discussed and shown in FIG. 1.

As is generally known in the art, material is supplied to the extruder in any convenient manner, such as by a hopper 30. The rotational power for the feed screw 36 is also provided in a conventional manner, as by an electric motor 12, connected to a belt or other transmission type 18 that drives the screw 36. Since the movement of the feed screw 36 is rotational only, the drive system is greatly simplified over the injection units having a screw which must also reciprocate.

The melt accumulator 52 is essentially a variable volume reservoir by virtue of a cylindrical barrel 59 and a piston assembly 22 that moves linearly within the barrel 59. The relative size of the barrel 59 and piston assembly 22, as well as the stroke of the piston 22, will vary according to the quantity of melt required to fill the mold. In the constriction of melt accumulator 52, it is desirable to configure the end-shape of the barrel 59 and piston 22 in a way that minimizes the amount of resin remaining in the barrel 59 when the piston 22 is fully extended.

The outlet of the feed screw 36 connects to accumulator 52 via a suitable conduit 50. At a convenient point between the feed screw 36 and the inlet to the melt accumulator 52, a ball check valve 56 or other suitable non-return device is provided to control the direction of the flow through conduit 50. When the hydraulic accumulator 24 is activated to inject plastic into the mold cavity and maintain pressure during pack and hold, the check valve 56 prevents a back-flow of melt into the feed screw 36 due to the pressure differential. The outlet of the melt accumulator 52 is connected to the injection mold (not shown) via a suitable outlet 40.

The piston 22 of melt accumulator 52 is preferably selectably actuated by the hydraulic valve 46 which directs the stored energy in the hydraulic accumulator 24 to extend the piston 22.

The electric motor 12 is connected to the hydraulic motor 16 via a transmission means like belts 18 and 20. As the electric motor turns the feed screw 36 it also powers the hydraulic motor 16 wherein the hydraulic motor 16 charges the accumulator 24. The stored hydraulic energy in the accumulator 24 is then used to stroke piston 22 and inject the melt into outlet 40.

The operation of the injection molding machine 100, incorporating the two-stage injection unit of the present invention will now be described. The feed screw 36 is rotated within extruder housing 38 by the extruder motor 12 to begin plastication of the material that will be supplied as plastic melt to the melt accumulator 52. The rotation of the screw 36 builds pressure at the end of the feed screw 36, moving (opening) the ball check valve 56 and causing material to flow through the conduit 50 and into the melt accumulator 52. When the pressure of the plastic melt reaches a certain level, it will begin to force the piston 22 rearwardly.

The extrusion function is complete and rotation of the feed screw 36 is stopped when a sufficient charge of plastic melt is accumulated in front of the piston 22 in the melt accumulator 52, as required to fill the cavity of the mold. At this point the hydraulic valve 46 is actuated to direct pressure and flow to the inlet of piston 22. The forward movement of the piston 22 causes the accumulated plastic melt to be forced through the outlet 40 and into the mold cavity. The injection pressure generated by movement of the piston 22 moves the ball check valve 56 to a position that prevents transfer of the melted resin into the extruder housing 38.

Optionally, a clutch mechanism 58 is provided between the electric motor 12 and the feed screw 36 such that the electric motor 12 may be disengaged from the feed screw 36 which allows the electric motor 12 to continuously drive the hydraulic motor 16 and charge the hydraulic accumulator 24. The clutch mechanism 58 therefore allows the electric motor 12 to remain on and charge the accumulator 24 during the injection cycle.

Figure 3:
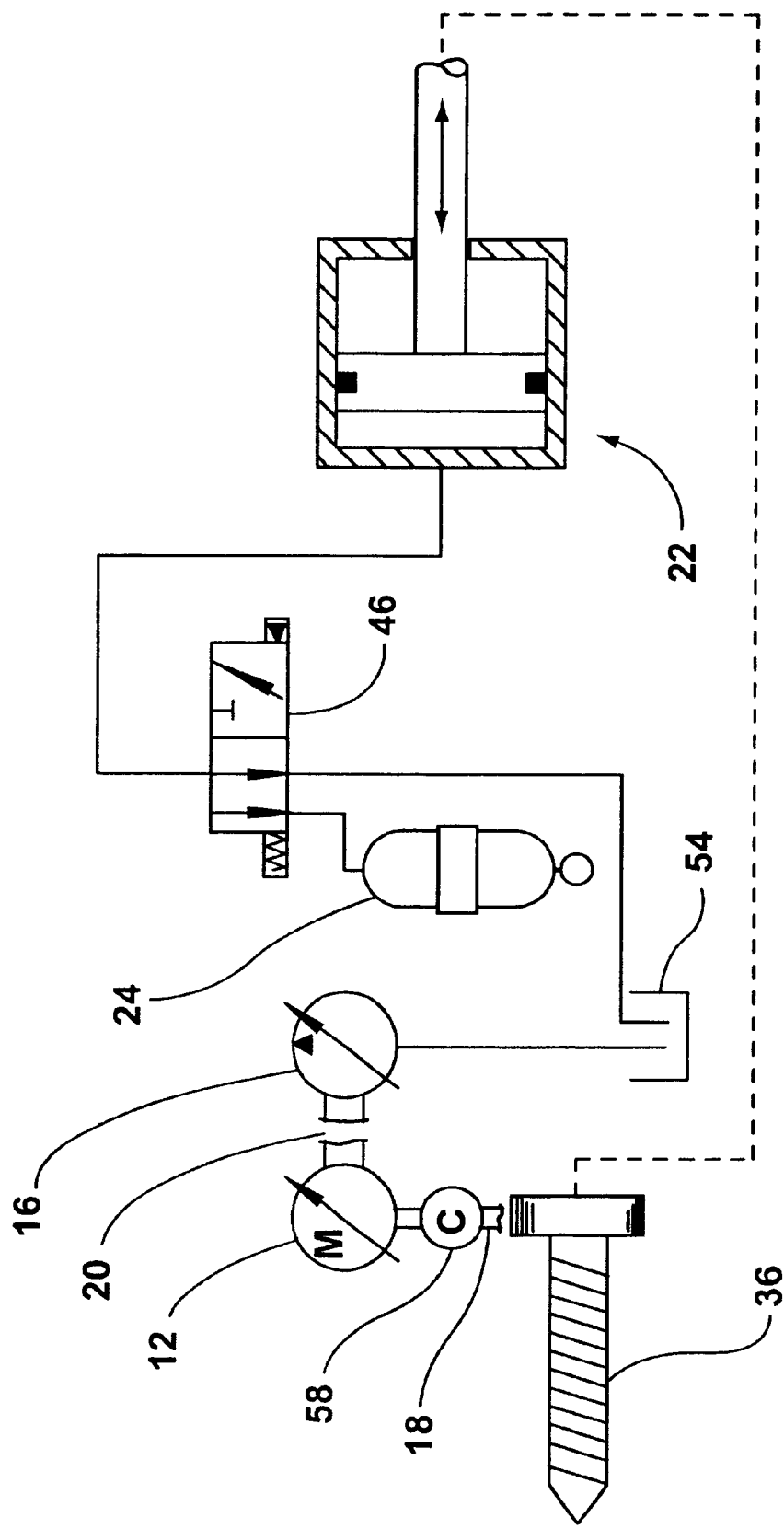
FIG. 3 is a simplified hydraulic schematic of the injection unit of the present invention.

Referring now to FIG. 3, a simplified hydraulic schematic of the present invention is shown. As previously discussed, the hydraulic accumulator 24 is selectably actuated by a four-port, two position hydraulic valve 46. The valve is spring loaded to its normal state to allow the hydraulic motor 16 to charge the accumulator 24 and allow return flow of hydraulic fluid from the piston 22 to an oil reservoir 54 when the piston 22 is retracted during the extrusion process. When the valve 46 is activated, it directs the hydraulic flow from the accumulator 24 to the piston 22 which injects the melt into the melt cavity (not shown). The valve 46 can be a solenoid or servo controlled type, with the preferred embodiment being a servo-valve that allows for infinite adjustment of the time-pressure profile communicated to the piston 22 during injection.

Figure 4:
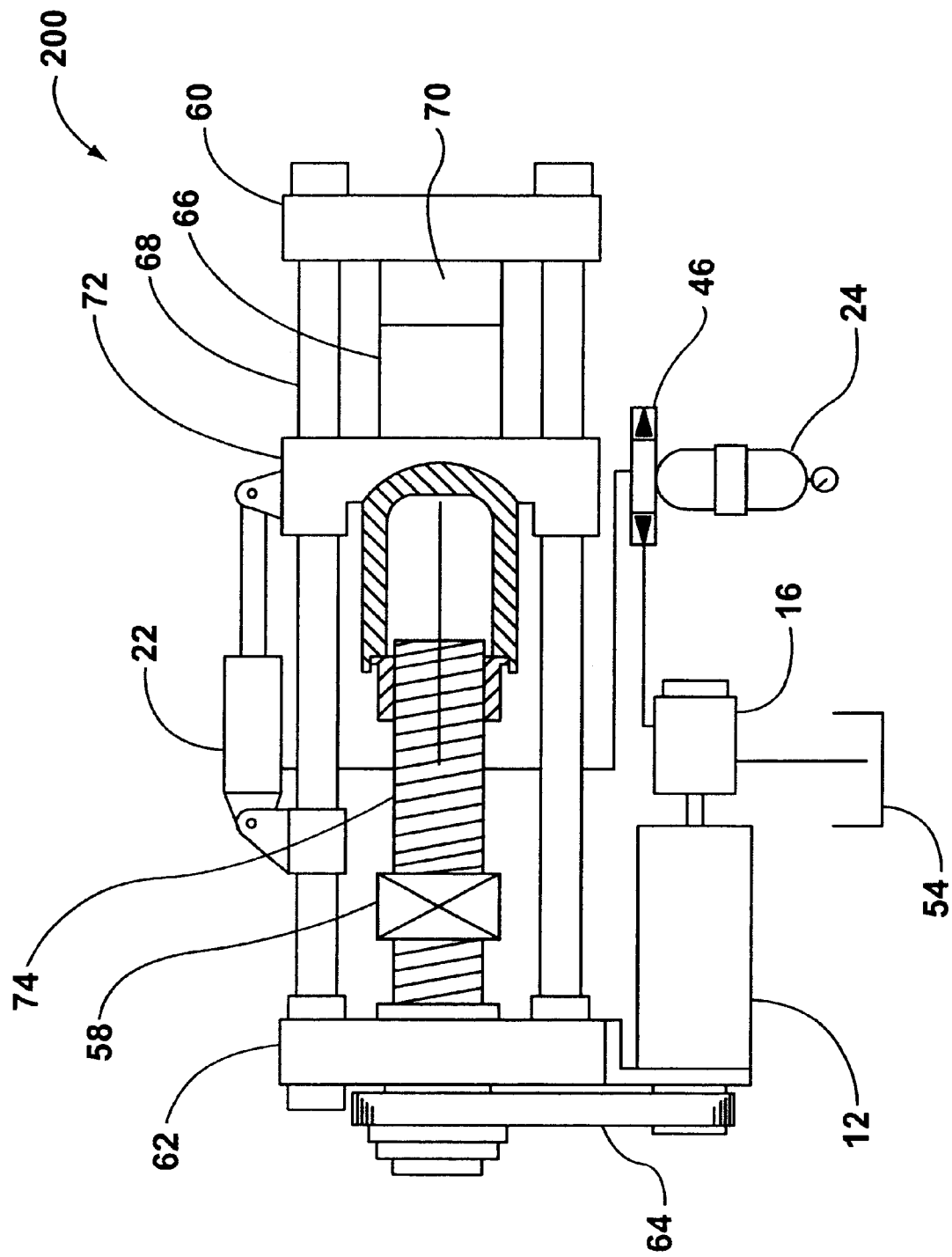
FIG. 4 is a simplified layout of an improved clamp unit of an injection molding machine incorporating the improved drive system.

Referring now to FIG. 4, an improved injection molding clamp system 200 is generally depicted. Utilizing many of the same energy efficient principles as previously discussed, an electric motor 12 is mounted to a base(not shown)which is in communication with a drive means 74 via a transmission means 64. Installed on drive means 74 is an optional clutch mechanism 58 for selectable engagement of the drive means 74 to the electric motor 12. Rigidly affixed to a distal end of a plurality of tie bars 68 is a first stationary platen 60. Rigidly affixed to the other distal end of the plurality of tie bars 68 is a second stationary platen 62. Disposed between the first and second stationary platens and guided by the plurality of tie bars 68 is a movable platen 72. The movable platen 72 is in communication with the drive means 74 whereby rotation of the drive means 74 will translate the movable platen 72 with respect to the stationary platens along the long axis of the plurality of tie bars 68.

Mechanically connected to the electric motor 12 is a hydraulic motor 16. The hydraulic motor 16 is in fluid communication with a hydraulic accumulator 24 through the use of a hydraulic valve 46. As the electric motor 12 drives the hydraulic motor 16, pressure and fluid from a reservoir 54 is selectably communicated via the hydraulic valve 46 to the hydraulic accumulator 24 for the storage of energy.

Rigidly affixed to the movable platen 72 is a movable mold half 66. Rigidly affixed to the first stationary platen 60 is a stationary mold half 70. As drive means 74 moves movable platen 72, the movable mold half 66 translates to open the mold and thereby allows a finished plastic part to be ejected from the mold.

The hydraulic accumulator 24 selectably communicates with a piston assembly 22 via the hydraulic valve 46. The hydraulic piston assembly 22 is operatively affixed between one of the stationary platens 60 or 62 and the movable platen 72. In the preferred embodiment the piston assembly 22 is a single acting hydraulic piston mounted to the second stationary platen 62.

In the arrangement shown in FIG. 4, the electric motor 12 performs two functions, one function is to open and close the mold halves 66 and 70. During this function, the optional clutch mechanism 58 is engaged and allows the electric motor 12 to activate the drive means 74. In the preferred embodiment, the drive means is of the ball-screw type. The second function of the electric motor 12 is to drive the hydraulic motor 16 which charges the accumulator 24 with stored energy.

Once the mold halves are brought completely together by the drive means 74, and in preparation for the injection cycle, the pressure and fluid charge stored in the accumulator 24 is communicated to the piston assembly 22 via the hydraulic valve 46. The pressure communicated to the piston assembly 22 from the accumulator 24 is required to hold the two mold halves 66 and 70 tightly together and resist the injection pressure, which acts to open the mold halves. Once the molded part is injected and following a predetermined dwell time which allows the molded part to freeze, pressure to the piston assembly 22 is removed via the hydraulic valve 46. At this point the electric motor 12 communicates with the drive means 74 to open the mold and eject the finished molded part from the mold cavities.

While the invention has been illustrated in some detail according to the preferred embodiment shown in the accompanying drawings, and while the preferred embodiment has been described in some detail, there is no intention to thus limit the invention to such detail. On contrary, it is intended to cover all modifications, alterations, and equivalents falling within the spirit and scope of the appended claims. For example, although the drive couplings are generally described as belts and pulleys, other mechanical couplings, such as suitable gearing, can be used to perform the same function.

I claim:

1. An injection molding machine with an improved drive system including an injection unit comprising:
    a feed screw within a barrel having an inlet and an outlet;
    a hydraulic motor selectably in communication with at least one hydraulic accumulator via at least one hydraulic valve;
    a rotational drive unit simultaneously,
        rotating said feed screw for the plastisizing and conveying of material within said barrel from said inlet to said outlet,
        and powering said hydraulic motor for storage of energy in said accumulator;
    a hydraulic piston in selectable communication with said accumulator via said hydraulic valve, said piston in communication with said feed screw wherein pressure and flow from said accumulator causes translation of said piston which translates said feed screw and injects material through said outlet.

2. The injection molding machine of claim 1 further comprising a clutch mechanism provided between said rotational drive unit and said feed screw whereby said feed screw may be selectably disengaged from said rotational drive unit.

3. The injection molding machine of claim 1 wherein said hydraulic valve is a spring biased solenoid valve.

4. The injection molding machine of claim 1 wherein said hydraulic valve is a servo-controlled valve.

5. The injection molding machine of claim 1 wherein said hydraulic valve is a hydraulic pilot valve.

6. The injection molding machine of claim 1 wherein said rotational drive unit is an electric motor.

7. The injection molding machine of claim 1 wherein said rotational drive is a variable speed electric motor.

8. The injection molding machine of claim 1 wherein said rotational drive unit communicates with said hydraulic motor using at least one torque transmitting belt.

9. The injection molding machine of claim 1 wherein said rotational drive unit communicates with said hydraulic motor using at least one gear set.

10. The injection molding machine of claim 1 wherein said accumulator is a gas charged piston type.

11. The injection molding machine of claim 1 wherein said accumulator is a gas charged bladder type.

* * * * *